June 4, 1929.  R. M. MARLER  1,716,180
PRUNING SHEARS
Filed Nov. 23, 1928   2 Sheets-Sheet 2
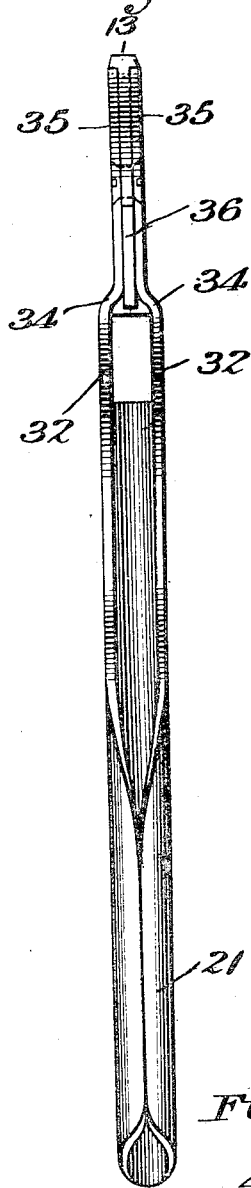
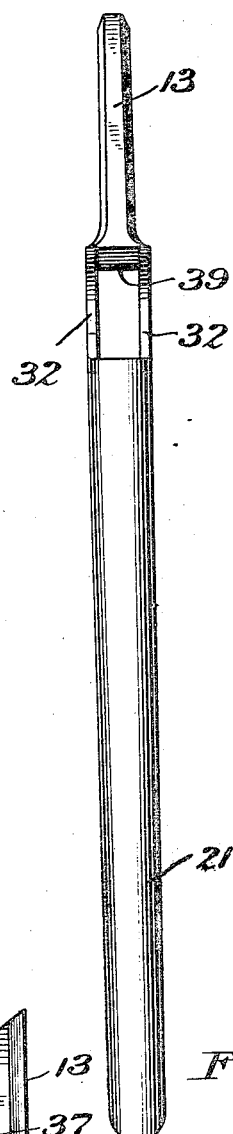
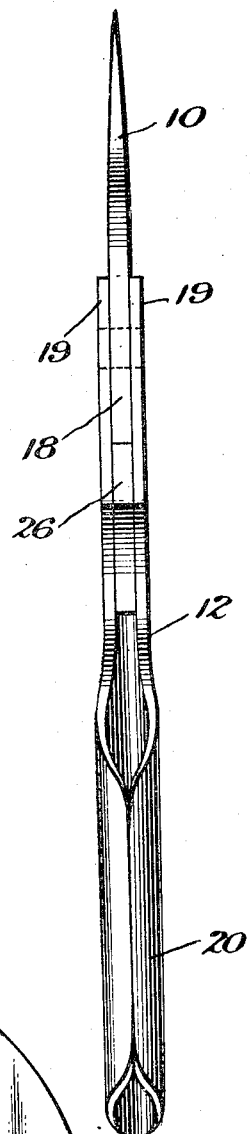
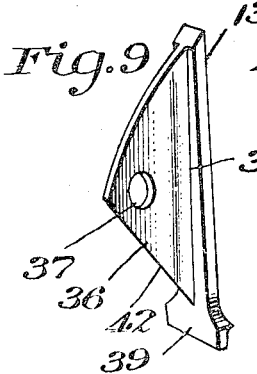
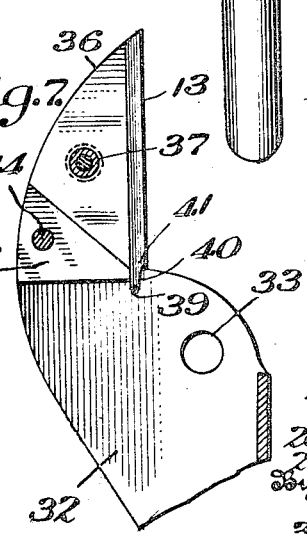
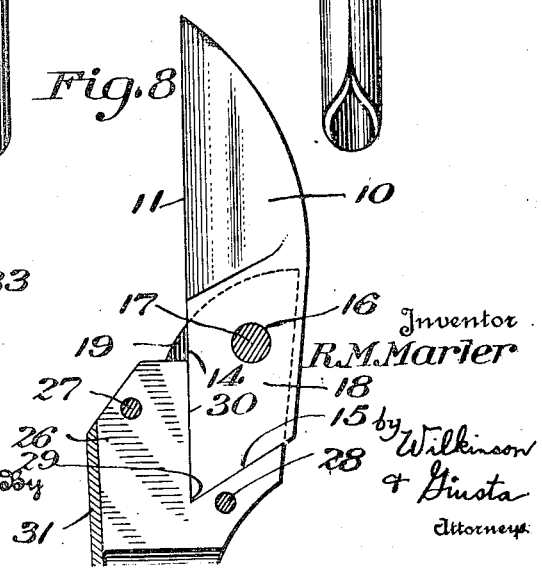
Inventor
R. M. Marler
by Wilkinson & Giusta
Attorneys Patented June 4, 1929.

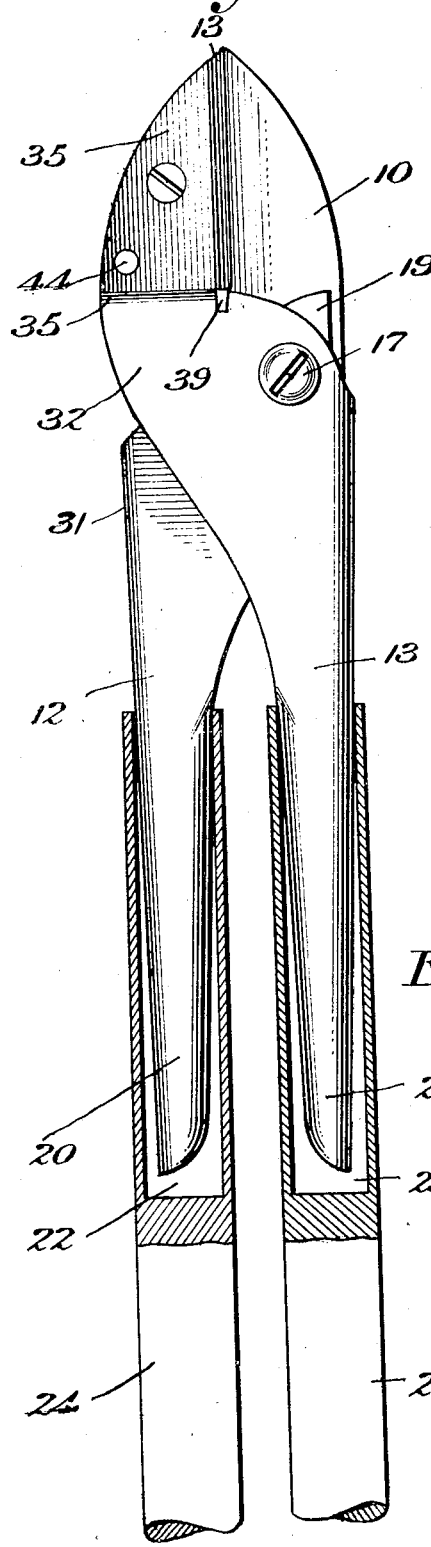
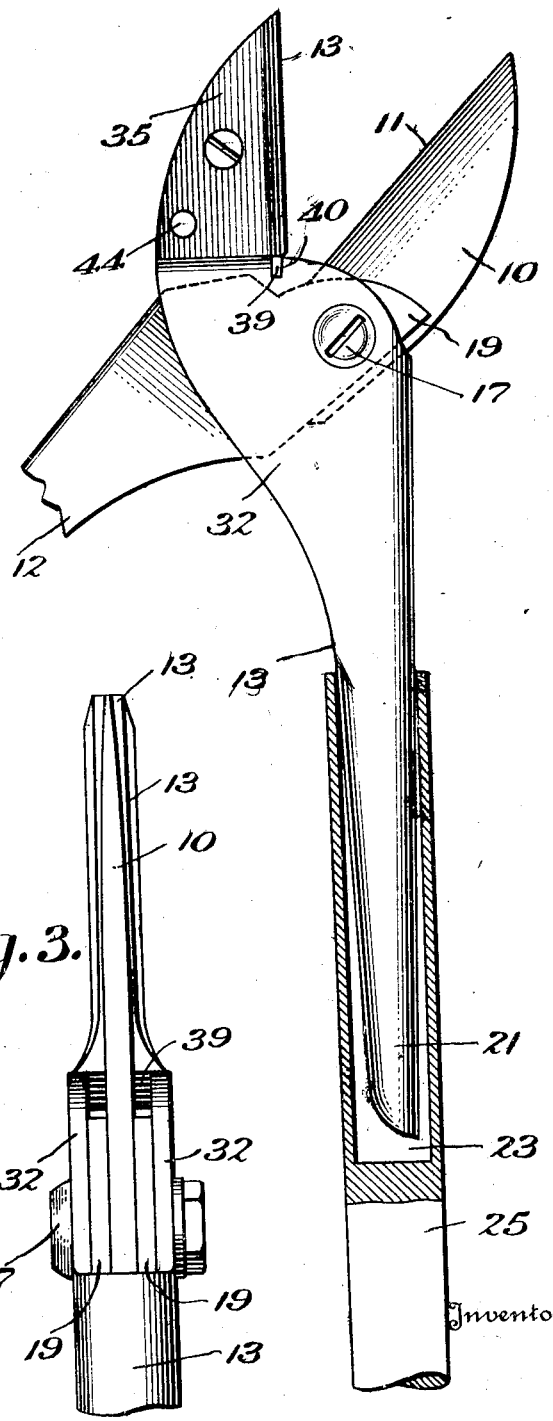

1,716,180

UNITED STATES PATENT OFFICE.

ROY MELTON MARLER, OF LAKELAND, FLORIDA.

PRUNING SHEARS.

Application filed November 23, 1928. Serial No. 321,455.

The present invention relates to improvements in pruning shears, and has for an object to provide an improved shears construction in which a slicing movement of a blade upon an anvil will be had, thereby increasing the cutting power and the smoothness of the operation.

Another object of the invention is to so co-ordinate and arrange the parts of the improved pruning implement as to secure a shearing motion of the blade upon the anvil in a direction inwardly of the implement, whereby the twig, branch of the tree or other material to be cut will be drawn into the shears without pinching, jamming, slipping or wedging.

Further objects of the invention are to provide an improved anvil construction for the shears; to improve the construction of the blade and the blade holder and to construct a novel form of handle, whereby to improve generally the construction, increase the strength and reduce the expense of these articles.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of the improved shears with the extension handles shown partly in section and partly broken away.

Figure 2 is a similar view with the shears shown in the open position and with parts removed.

Figure 3 is a fragmentary edge view of the improved shears looking from the blade side.

Figure 4 is an edge view of the anvil carrying handle member.

Figure 5 is also an edge view of the same member looking at the opposite edge.

Figure 6 is an edge view of the blade carrying handle member from the blunt edge of the blade.

Figure 7 is a vertical section, with parts broken away taken through the anvil frame.

Figure 8 is a similar view taken through the blade holder.

Figure 9 is a perspective view of the improved anvil.

Referring more particularly to the drawings the blade 10 having the straight cutting edge 11 is carried by one of the handle members 12 and cooperates with the enlarged shouldered portion 13 of the anvil which is carried by the companion handle member 13. The blade, as shown in Figure 8, is provided with a straight edge 14 approximately in alinement with the cutting edge 11 and with a diagonal lower edge 15, the blade being perforated, is indicated at 16 to receive the pivot or fulcrum bolt 17 by which the two handle members 12 and 13 are pivotally secured in the crossed relation.

The lower portion or tang 18 of the blade 10 fits between a pair of bearing plates 19 which are a part of the handle member 12. These two plates are closely spaced together, the handle member and such plates being preferably made from such material as wrought iron, whereby the handle members may be rolled to provide the grips 20 and 21 for engagement by the hands of the operator or in the sockets 22 and 23 of the extension handles 24 and 25, shown in Figures 1 and 2.

Returning to Figure 8, a brace block 26 is shown as received between the bearing plates 19 below and to one side of the tang 18 of the blade 10. This bearing block is secured to the side plates 19 in any appropriate manner, as for instance by the use of the rivets 27 and 28, the same being located at opposite sides of the pointed portion 29 of the tang 18. The bearing block 26 is cut away along its upper edge and through one side to form a pointed recess, to receive the pointed portion 29 of the tang 18. The vertical wall 30 of the recess snugly receives the vertical wall 14 of the tang. The lower wall of the recess is also formed on the diagonal to snugly receive and support the lower diagonal edge 15 of the tang. The front wall of the block 26 is received snugly against the wall 31 which connects the two plates 19, it being understood that these plates are not connected at their opposite edges.

The opposite handle member 13 is rolled and formed in like manner and involves the two parallel bearing plates 32 which are spaced a wider distance apart than the plates 19, so as to receive therebetween such plates 19. The plates 32 are provided with the perforations 33 to receive the fulcrum bolt 17 by which the parts are pivotally secured together.

The outer portions of the plates 32, as shown in Figure 4, are brought closer together, as indicated at 34, and provide two more closely spaced cheek plates 35 forming an anvil frame. The web 36 of the anvil, as shown in Figure 9, is snugly received between the plates 35 and this web 36 is formed with one or more perforations 37 to receive rivets, screws or other appropriate fastenings by which the anvil may be held either permanently or detachably in the anvil frame. The outer portion 13 of the anvil is straight to cooperate with the blade edge 11 and shoulders 38 are formed between the web and this enlarged portion 13. These shoulders are adapted to abut against the outer edges of the plates 35.

The lower portion of the anvil part 13 is enlarged laterally and extended downwardly to form a projection 39 adapted to enter a socket or notch 40 provided in the upper edge portions of the plates 32 adjacent the plates 35. A shoulder 41 is also provided on the anvil adjoining the projection 39 for engaging the upper edges of the spaced plates 32.

The lower edge 42 of the web is angular or diagonal and rests throughout against the similarly formed edge of the brace block 43, which is also received between the plates 35 and held therein as by the rivet 44 or other fastening means.

In the use of the device, the grips 20 and 21 are either taken in the hands or placed in the sockets 22 and 23 of the extension handles 24 and 25; in which latter case the extension handles are manipulated by the operator on the ground below, while the shears are engaged with twigs and branches of the tree to be pruned. The handle members are swung back and forth on the fulcrum 17 to open and close the blade. If we assume the blade to be in the open position, shown in Figure 2, and a twig or branch to be engaged between the blade 10 and the anvil 13, then by drawing the handles 12 and 13 together, the blade may be closed upon the anvil. In so moving the blade will not only pivot toward the anvil, but, due to the offset position of the fulcrum 17 from the meeting line between the straight faced blade and anvil, the blade will be bodily moved downwardly or inwardly with respect to the anvil thus causing the blade to wipe downwardly of the anvil and to perform a shearing or slicing cut, enabling the severance of the wood with less effort on the part of the operator and less shock, jar and wear upon the shears, and with a cleaner cut upon the tree. The strains set up in the blade and anvil will be adequately taken care of by the mounting of these parts in connection with the brace blocks. The stresses set up in the web 36 of the anvil, will be substantially resolved, due to the peculiar motion of the blade 10, in the components which act down substantially at right angles against the diagonal upper edge of the brace block 43 and consequently this block due to its triangular formation, is well suited to withstand these strains.

The strains incident to the blade 10 are taken up by the bearing block 26 and the wall 31, while the V-shaped portion of the blade tank and block 26 will resist any tendency of the blade to rotate about the pivot pin 17.

The anvil is preferably made from some soft metal to avoid dulling the edge 11 of the blade.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved pruning shears comprising a pair of pivoted and crossed handles, an anvil frame on one of the handles having a recess therein, an anvil removably mounted in said frame having a projection entering said recess and formed with a diagonal lower edge, a brace block mounted in said frame behind the anvil and abutting against said projection and having a diagonal upper edge for lying in contact with the diagonal edge of the anvil, a blade holder on the other handle, and a blade for cooperating with said anvil carried by said holder.

2. An improved pruning shears comprising a pair of pivoted and crossed handles, an anvil holder on one of the handles including side plates, an anvil having a web adapted to enter between said plates and be secured thereto and having an outer shouldered portion for engaging the edges of the plates and further provided with an inner wide projection portion for entering a recess in the frame at the base of the plates, a brace block mounted between said plates and engaging the lower edge of the web, a blade handle, and a blade cooperating with the anvil and carried by said holder.

ROY MELTON MARLER.